United States Patent
Egawa et al.

(10) Patent No.: US 10,976,711 B2
(45) Date of Patent: Apr. 13, 2021

(54) CONTROL DEVICE, CONTROL METHOD, AND NON-TRANSITORY COMPUTER READABLE MEDIUM FOR FUEL CELL SYSTEM

(71) Applicant: TOYOTA JIDOSHA KABUSHIKI KAISHA, Toyota (JP)

(72) Inventors: Toshihiro Egawa, Okazaki (JP); Tetsuya Bono, Miyoshi (JP); Masahiro Okuyoshi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/267,853

(22) Filed: Feb. 5, 2019

(65) Prior Publication Data
US 2019/0267650 A1   Aug. 29, 2019

(30) Foreign Application Priority Data
Feb. 23, 2018   (JP) .............................. JP2018-030566

(51) Int. Cl.
*G05B 11/06* (2006.01)
*H01M 8/04746* (2016.01)
(Continued)

(52) U.S. Cl.
CPC ............ *G05B 11/06* (2013.01); *G05B 13/041* (2013.01); *H01M 8/04335* (2013.01);
(Continued)

(58) Field of Classification Search
CPC ......... H01M 8/04753; H01M 8/04335; H01M 8/04388; H01M 8/04768; H01M 2250/20;
(Continued)

(56) References Cited

U.S. PATENT DOCUMENTS

| 5,406,927 A | * | 4/1995 | Kato | ................... F02D 41/0045 |
| | | | | 123/674 |
| 2005/0175871 A1 | * | 8/2005 | Kolodziej | ......... H01M 8/04089 |
| | | | | 429/431 |
| 2008/0157724 A1 | * | 7/2008 | Fattal | ........................ H02P 9/04 |
| | | | | 322/7 |

FOREIGN PATENT DOCUMENTS

JP   2007-012548   1/2007

OTHER PUBLICATIONS

Stanley, Greg. "Exponential Filter" [online], Online dated Mar. 13, 2013 [retrieved on Mar. 2, 2020], Retrieved from the Internet<URL: https://web.archive.org/web/20130313185236/https://gregstanleyandassociates.com/whitepapers/FaultDiagnosis/Filtering/Exponential-Filter/exponential-filter.htm (Year: 2013).*

* cited by examiner

*Primary Examiner* — James J Lee
*Assistant Examiner* — Shon G Foley
(74) *Attorney, Agent, or Firm* — Finnegan, Henderson, Farabow, Garrett & Dunner, LLP

(57) ABSTRACT

A control device includes a target value acquisition portion configured to acquire a target value of amount of control per predetermined computation cycle, a control portion configured to control the control target using the acquired target value, a target smoothing value calculation portion configured to calculate a target smoothing value in which a temporal change in the target value is slowed down, and a state determination portion configured to calculate a first difference that is a difference between the target value and the target smoothing value to determine that the amount of control is in a transient state when the calculated first difference is equal to or more than a predetermined first threshold value and to determine that the amount of control (Continued)

is in a non-transient state when the first difference is smaller than the first threshold value.

10 Claims, 8 Drawing Sheets

(51) Int. Cl.
    *H01M 8/0438*     (2016.01)
    *G05B 13/04*     (2006.01)
    *H01M 8/0432*     (2016.01)

(52) U.S. Cl.
    CPC ... *H01M 8/04388* (2013.01); *H01M 8/04753* (2013.01); *H01M 8/04768* (2013.01); *H01M 2250/20* (2013.01)

(58) Field of Classification Search
    CPC .......... H01M 8/04679; H01M 8/04992; G05B 13/041; G05B 11/06
    See application file for complete search history.

CONTROL DEVICE, CONTROL METHOD, AND NON-TRANSITORY COMPUTER READABLE MEDIUM FOR FUEL CELL SYSTEM

CROSS-REFERENCE TO RELATED APPLICATIONS

The present application claims priority based on Japanese patent application No. 2018-30566 filed on Feb. 23, 2018, the disclosure of which is hereby incorporated by reference in its entirety.

BACKGROUND

Field

The present disclosure relates to a control device which controls a control target device.

Related Art

In a fuel cell system, various devices related to the power generation of a fuel cell are used. Specific examples thereof include a device which is used for supply of a reaction gas, a device which is used for discharge of an off-gas, and a device which is used for circulation of a cooling medium. For example, as the device which is used for supply of a reaction gas, an injector which jets hydrogen gas as a fuel gas and the like apply. While the degrees of opening of valves which are present in the supply path and the discharge path of hydrogen gas are kept constant, the amount of hydrogen gas jetted by the injector is controlled, and thus it is possible to adjust a pressure on an anode side. When the amount of hydrogen gas jetted is changed, the pressure on the anode side is changed from a transient state to a non-transient state. The change of the state as described above is not limited to the pressure on the anode side, and is common to an arbitrary amount of control which may be changed by the operation of a device involved in the power generation of the fuel cell. Japanese Unexamined Patent Application Publication No. 2007-12548 discloses, as a method of determining whether a transient state is present, a method of calculating a difference value between a requirement output (target value) for a fuel cell stack and a current output (amount of control) and determining that the fuel cell stack is in a transient operation state when the difference value is equal to or more than a threshold value.

However, in the fuel cell system of Patent Literature 1, when the degree of an instantaneous change is changed while the requirement output is being changed, for example, when the driver of a vehicle in which the fuel cell system is installed slightly reduces the amount of stepping on of an accelerator pedal during rapid acceleration, the requirement output is instantaneously lowered, and thus a difference between the requirement output and the current output is equal to or less than the threshold value, with the result that it may be erroneously determined that the transient state is not present.

The problem in which whether the transient state is present is erroneously determined is common to an arbitrary amount of control which may be changed by the operation of a device involved in the power generation of the fuel cell such as the pressure on the anode side described above and the flow rate of cooling water. Furthermore, the problem is also common to the state of an arbitrary type of amount of control which may be changed by the operation of an arbitrary type of control target device regardless of a device involved in the power generation of the fuel cell. Hence, it is desired to provide a technology which is able to suppress an erroneous determination as to whether the amount of control which may be changed by the operation of a control target device is in a transient state.

SUMMARY

According to one aspect of the present disclosure, a control device for controlling a control target device is provided. The control device includes: a target value acquisition portion configured to acquire a target value of amount of control per predetermined computation cycle, the amount of control being changed according to an operation of the control target device; a control portion configured to control the control target using the acquired target value; a target smoothing value calculation portion configured to calculate a target smoothing value in which a temporal change in the target value is slowed down; and a state determination portion configured to calculate a first difference that is a difference between the target value and the target smoothing value to determine that the amount of control is in a transient state when the calculated first difference is equal to or more than a predetermined first threshold value and to determine that the amount of control is in a non-transient state when the first difference is smaller than the first threshold value.

DETAILED DESCRIPTION

A. Embodiments

Figure 1:
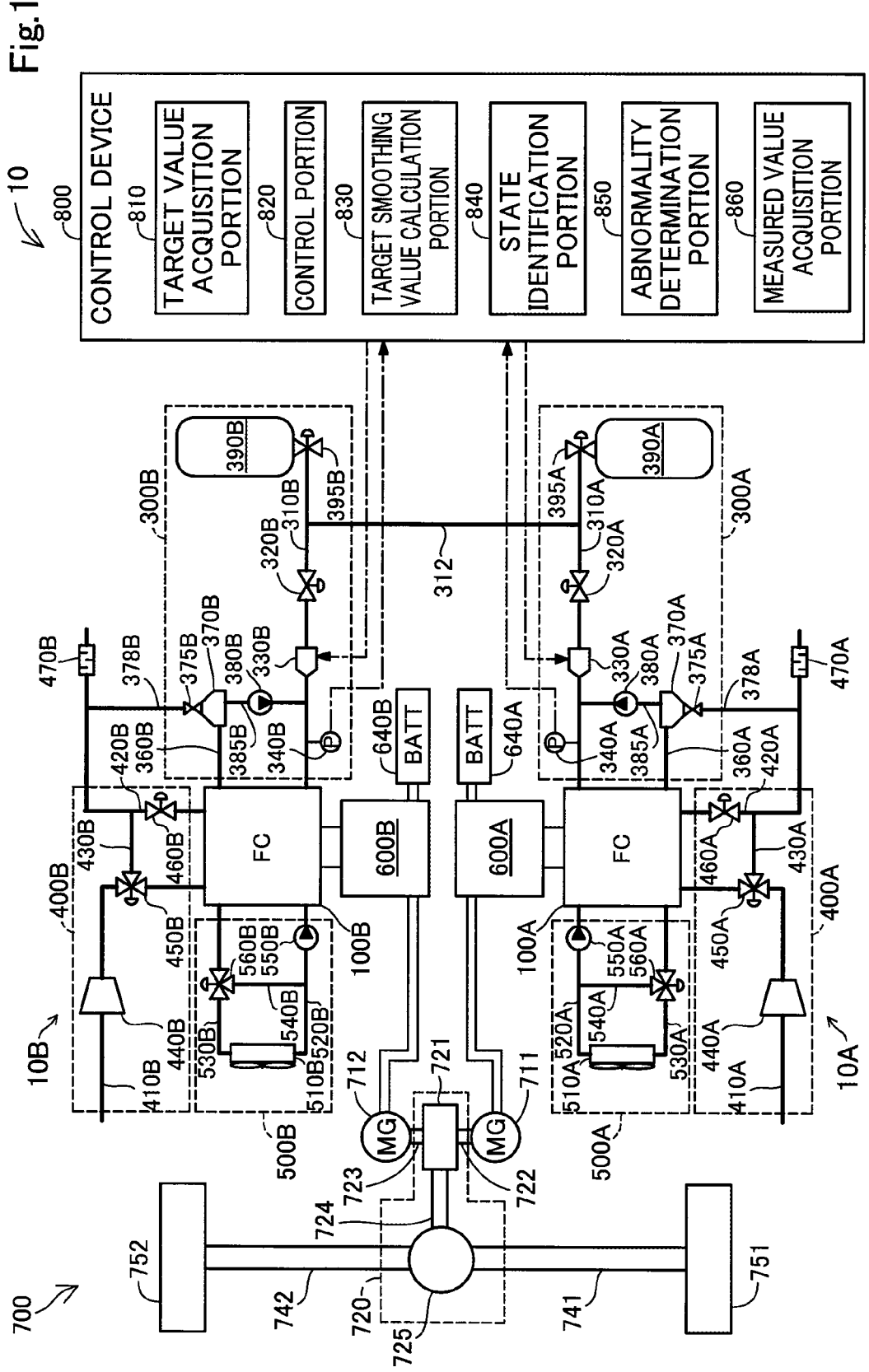
FIG. 1 is a block diagram showing a schematic configuration of a fuel cell system which includes a control device according to an embodiment of the present disclosure.

A1. Device Configuration:

FIG. 1 is a block diagram showing a schematic configuration of a fuel cell system 10 which includes a control device 800 according to an embodiment of the present disclosure. The fuel cell system 10 is installed in a vehicle as a system for supplying electric power to a drive portion 700 of the vehicle.

The drive portion 700 uses the electric power supplied from the fuel cell system 10 so as to provide power to front wheels 751 and 752. In addition to the front wheels 751 and 752, the power may be provided to unillustrated rear wheels. The drive portion 700 includes a transaxle 720, two motor generators 711 and 712, and two drive shafts 741 and 742.

The transaxle 720 includes a gear 721, rotary shafts 722 and 723, a propeller shaft 724, and a differential gear 725. The motor generators 711 and 712 are driven by the electric power supplied from the fuel cell system 10, and generates, at the time of deceleration, regenerative power and supplies it to the fuel cell system 10. The motor generator 711 is connected through the rotary shaft 722 to the gear 721. Likewise, the motor generator 712 is connected through the rotary shaft 723 to the gear 721. The gear 721 converts a drive force transmitted from the rotary shafts 722 and 723 into the rotation of the propeller shaft 724. The differential gear 725 is connected to the propeller shaft 724 and the drive shafts 741 and 742. The differential gear 725 converts the rotation of the propeller shaft 724 into the rotation of the drive shafts 741 and 742. The drive shaft 741 is connected to the front wheel 751. Likewise, the drive shaft 742 is connected to the front wheel 752. As described above, in the present embodiment, the electric power supplied from the fuel cell system 10 (two fuel cell subsystems 10A and 10B which will be described later) is converted by the motor generators 711 and 712 into the drive force, and the drive force is transmitted to the front wheels 751 and 752.

The fuel cell system 10 includes the first fuel cell subsystem 10A, the second fuel cell subsystem 10B, and a control device 800. The first fuel cell subsystem 10A and the second fuel cell subsystem 10B are controlled by an unillustrated main control device. The main control device is configured with an ECU (Electronic Control Unit) formed with a microcomputer which includes a CPU (Central Processing Unit) and a storage device, and is also referred to as a main ECU.

The first fuel cell subsystem 10A and the second fuel cell subsystem 10B have the same configuration. Hence, in the following discussion, the first fuel cell subsystem 10A will be described in detail, and a detailed description of the second fuel cell subsystem 10B will be omitted. The individual constituent elements of the second fuel cell subsystem 10B are identified with symbols which are obtained by replacing "A" at the ends of symbols of the corresponding constituent elements in the first fuel cell subsystem 10A with "B".

The first fuel cell subsystem 10A includes a fuel cell 100A, a hydrogen supply/discharge system 300A, an air supply/discharge system 400A, a cooling system 500A, a power supply circuit 600A, and a secondary battery 640A.

The fuel cell 100A is the supply source of electric power in the first fuel cell subsystem 10A, and is configured with a solid polymer-type fuel cell. The fuel cell 100A generates electric power by an electrochemical reaction between hydrogen serving as a fuel gas and oxygen serving as an oxidation gas. The fuel cell 100A may be configured with, instead of the solid polymer-type fuel cell, an arbitrary type of fuel cell such as a solid oxide-type fuel cell. The fuel cell 100A has a stack structure in which a plurality of unit cells unillustrated are stacked in layers. Each of the unit cells includes a membrane electrode junction member in which electrodes are arranged on both surfaces of an electrolyte membrane and a pair of separators which sandwich the membrane electrode junction member. In each of the unit cells which configure the fuel cell 100A, an anode to which hydrogen is supplied through the electrolyte membrane and a cathode to which air is supplied are formed.

The hydrogen supply/discharge system 300A supplies hydrogen to the fuel cell 100A and discharges, to the outside, an anode off-gas which is discharged from the fuel cell 100A. The hydrogen supply/discharge system 300A includes a tank 390A, a main stop valve 395A, a hydrogen supply path 310A, a pressure reducing valve 320A, an injector 330A, a pressure sensor 340A, an anode off-gas discharge path 360A, a gas-liquid separator 370A, a circulation flow path 385A, a circulation pump 380A, a purge valve 375A, and an exhaust drain path 378A.

The tank 390A stores hydrogen at high pressure. The tank 390A is connected through the main stop valve 395A to the hydrogen supply path 310A. In the first fuel cell subsystem 10A, each of a plurality of tanks 390A may be connected to the hydrogen supply path 310A. The hydrogen supply path 310A configures a gas flow path for supplying the hydrogen in the tank 390A to the fuel cell 100A. In the fuel cell system 10, the hydrogen supply path 310A of the first fuel cell subsystem 10A and the hydrogen supply path 310B of the second fuel cell subsystem 10B communicate with each other through a communication path 312. Hence, hydrogen is supplied to the fuel cell 100A from the tank 390A of the first fuel cell subsystem 10A and the tank 390B of the second fuel cell subsystem 10B. The main stop valve 395A controls the supply and interruption of hydrogen from the tank 390A. In the hydrogen supply path 310A, the pressure reducing valve 320A is arranged between the main stop valve 395A and the injector 330A. The pressure reducing valve 320A reduces a high pressure (primary pressure) on the side of the tank 390A to a preset low pressure (secondary pressure). The injector 330A is arranged in the hydrogen supply path 310A and jets the hydrogen gas whose pressure has been reduced by the pressure reducing valve 320A at a flow rate corresponding to an instruction from the control device 800. The pressure sensor 340A is arranged, in the hydrogen supply path 310A, on the downstream side of the injector 330A and in the vicinity of the fuel cell 100A, and detects a pressure in the hydrogen supply path 310A. In the first fuel cell subsystem 10A, the pressure detected by the pressure sensor 340A is treated as a pressure on an anode side. The anode off-gas discharge path 360A feeds the anode off-gas discharged from the fuel cell 100A to the gas-liquid separator 370A. The gas-liquid separator 370A separates, from the anode off-gas discharged from the fuel cell 100A and mixed with liquid water, the liquid water and an impurity gas such as nitrogen gas. The circulation flow path 385A connects the gas-liquid separator 370A and the hydrogen supply path 310A together. This connection part is located between the injector 330A and the pressure sensor 340A. The circulation pump 380A is arranged in the circulation flow path 385A, and feeds, to the hydrogen supply path 310A, the anode off-gas after the separation of the liquid water and the impurity gas such as nitrogen gas, that is, a gas containing hydrogen which is not used in the electrochemical reaction. The purge valve 375A is connected to the gas-liquid separator 370A and the exhaust drain path 378A so as to control the communication and the interruption of the gas-liquid separator 370A and the exhaust drain path 378A. The purge valve 375A is opened, and thus the liquid water and the impurity gas separated by the gas-liquid separator 370A are discharged through the exhaust drain path 378A and an air discharge path 420A to the outside.

The air supply/discharge system 400A supplies air containing oxygen serving as an oxidation gas to the fuel cell 100A and discharges, to the outside, the cathode off-gas discharged from the fuel cell 100A. The air supply/discharge system 400A includes an air supply path 410A, an air compressor 440A, an air discharge path 420A, a bypass path 430A, a flow division valve 450A, and a pressure adjustment valve 460A.

The air supply path 410A configures the flow path of air supplied to the fuel cell 100A. In the air supply path 410A, the air compressor 440A and a sensor, an intercooler, and the like, which are not shown in the figure, are arranged. The air compressor 440A is arranged in the air supply path 410A, compresses air, and feeds it out to the cathode of the fuel cell 100A. Examples of the sensor and the like which are described above and are not shown in the figure include a temperature sensor that detects an outside temperature, an atmospheric pressure sensor that detects an atmospheric pressure, an air flow meter that detects the flow rate of air, a pressure sensor that detects the pressure of air fed out from the air compressor 440A, and a temperature sensor that detects the temperature of air supplied to the cathode of the fuel cell 100A. The air discharge path 420A discharges air which is the cathode off-gas discharged from the fuel cell 100A and air which is divided to the bypass path 430A to the outside through a muffler 470A. The bypass path 430A makes the air supply path 410A and the air discharge path 420A communicate with each other. The flow division valve 450A is arranged in the air supply path 410A and is connected to the bypass path 430A, and adjusts the flow rate of air to the fuel cell 100A and the bypass path 430A. The pressure adjustment valve 460A is arranged, in the air discharge path 420A, on the side of the fuel cell 100A with respect to the connection part of the bypass path 430A. The pressure adjustment valve 460A adjusts the pressure of the cathode.

The cooling system 500A passes a coolant through a circulation path including the fuel cell 100A so as to adjust the temperature of the fuel cell 100A. The cooling system 500A includes a coolant supply path 520A, a coolant discharge path 530A, a radiator 510A, a bypass path 540A, a three-way valve 560A, and a coolant pump 550A. The coolant supply path 520A supplies cooling water serving as the coolant to the fuel cell 100A. Instead of the cooling water, an antifreeze such as ethylene glycol, air, or the like may be used. The coolant discharge path 530A feeds the coolant discharged from the fuel cell 100A to the radiator 510A. The radiator 510A radiates the heat of the coolant. The bypass path 540A makes the coolant supply path 520A and the coolant discharge path 530A communicate with each other. The three-way valve 560A adjusts the flow rate of the coolant to the radiator 510A and the bypass path 540A. The coolant pump 550A is arranged in the coolant supply path 520A and circulates the coolant. The cooling system 500A includes an unillustrated ion exchanger and an unillustrated temperature sensor for detecting the temperature of the coolant.

The power supply circuit 600A includes an unillustrated step-up converter, step-up and step-down converters, an inverter, and the like which are electrically connected to the fuel cell 100A, the motor generator 711, and the secondary battery 640A, respectively. The power supply circuit 600A supplies electric power output from the first fuel cell subsystem 10A to the motor generator 711. The power supply circuit 600A also supplies, to the motor generator 711, electric power obtained by electrical discharge of the secondary battery 640A. The power supply circuit 600A also supplies, to the secondary battery 640A, the regenerative power output from the motor generator 711 and the electric power output from the first fuel cell subsystem 10A.

The control device 800 controls the injector 330A and an injector 330B which are control target devices. The control device 800 is configured with an ECU as with the unillustrated main control device. The control device 800 may be configured as part of the main control device. The control device 800 includes a target value acquisition portion 810, a control portion 820, a target smoothing value calculation portion 830, a state identification portion 840, an abnormality determination portion 850, and a measured value acquisition portion 860. The target value acquisition portion 810, the control portion 820, the target smoothing value calculation portion 830, the state identification portion 840, the abnormality determination portion 850, and the measured value acquisition portion 860 are each configured as function portions which function by the execution of control programs previously stored in the storage device by an unillustrated CPU included in the control device 800.

The target value acquisition portion 810 acquires the target value of a pressure on an anode side (hereinafter also simply referred to as a "target value") per predetermined computation cycle. The main control device calculates, according to a requirement output to the fuel cell system 10, the target values of pressures on the anode side in the fuel cell subsystems 10A and 10B per computation cycle. The requirement output to the fuel cell system 10 is increased, for example, as the amount of stepping on of an accelerator pedal by the driver of the vehicle is increased. Then, in this case, the target values are increased. A configuration may be adopted in which in the individual fuel cell subsystems 10A and 10B, control devices (hereinafter referred to as "FC control devices") are provided, and in which the FC control devices calculate the target values of the pressures on the anode side in the fuel cell subsystems 10A and 10B per computation cycle. In the configuration described above, the FC control devices may acquire the values of the requirement power from the main control device to the fuel cell subsystems 10A and 10B per computation cycle so as to calculate the target values based on the values of the requirement power. Then, the target value acquisition portion 810 may acquire the target values from the individual FC control devices.

The control portion 820 uses the target value acquired by the target value acquisition portion 810 and an actual measured value of the pressure on the anode side which is measured by the pressure sensor 340A so as to perform feedback control on the injector 330A. Likewise, the control portion 820 uses the target value acquired by the target value acquisition portion 810 and an actual measured value of the pressure on the anode side which is measured by the pressure sensor 340B so as to control the injector 330B. Since the control of the injector 330A and the control of the injector 330B are the same as each other, in the following discussion, the control of the injector 330A will be described as a typical one, and the control of the injector 330B will be omitted. The target smoothing value calculation portion 830 calculates a target smoothing value. The target smoothing value means a value in which a temporal change in the target value is slowed down. The details of the target smoothing value will be described later.

The state identification portion 840 performs state determination processing which will be described later so as to identify the state of the pressure on the anode side. The "state of the pressure on the anode side" includes a transient state and a non-transient state. In the present embodiment, the "transient state" is a state when a non-transient state is changed from another non-transient state, and means a state where a difference between a temporal change thereof and a temporal change in the target value is large. In the present embodiment, the "non-transient state" includes a state where the pressure on the anode side is constant and a state where a non-transient state is changed from another non-transient state, and where a difference between a temporal change thereof and a temporal change in the target value is small. In the present embodiment, a temporal change in the target value in the transient state is larger than a temporal change (hereinafter referred to as an "upper limit temporal change") in the pressure on the anode side when the injector 330A is operated at the upper limit speed of its response performance. The "the upper limit speed of the response performance of the injector 330A" means the maximum time change rate when the injector 330A changes the amount of hydrogen gas jetted according to an instruction from the control portion 820. When the upper limit temporal change is needed in order to realize the target value indicated by the control portion 820, the jetted amount of the injector 330A is changed, and thus it is possible to realize the instruction. By contrast, when a temporal change larger than the upper limit temporal change is needed in order to realize the target value indicated by the control portion 820, even if the jetted amount of the injector 330A is changed, it is impossible to realize the instruction. Hence, the "transient state" in the present embodiment may be said to be a state where the temporal change in the target value exceeds such a degree that the injector 330A is able to follow the temporal change in the target value by the change of the jetted amount of the injector 330A.

The abnormality determination portion 850 performs abnormal state determination processing which will be described later so as to determine whether the state of the operation of the injector 330A is an abnormal state. The measured value acquisition portion 860 acquires the measured values of the pressures on the anode side with the pressure sensors 340A and 340B.

In the fuel cell system 10 having the configuration described above, in order to determine the state of the pressure on the anode side, the state determination processing which will be described later is performed. The state determination processing is performed, and thus erroneous determination of whether the pressure on the anode side is in the transient state is suppressed. In the fuel cell system 10, in order to determine whether the state of the operation of the injector 330A is an abnormal state, the abnormal state determination processing which will be described later is performed. In the abnormal state determination processing, with consideration given to the state of the pressure on the anode side identified in the state determination processing, whether an abnormal state is present is determined.

Figure 2:
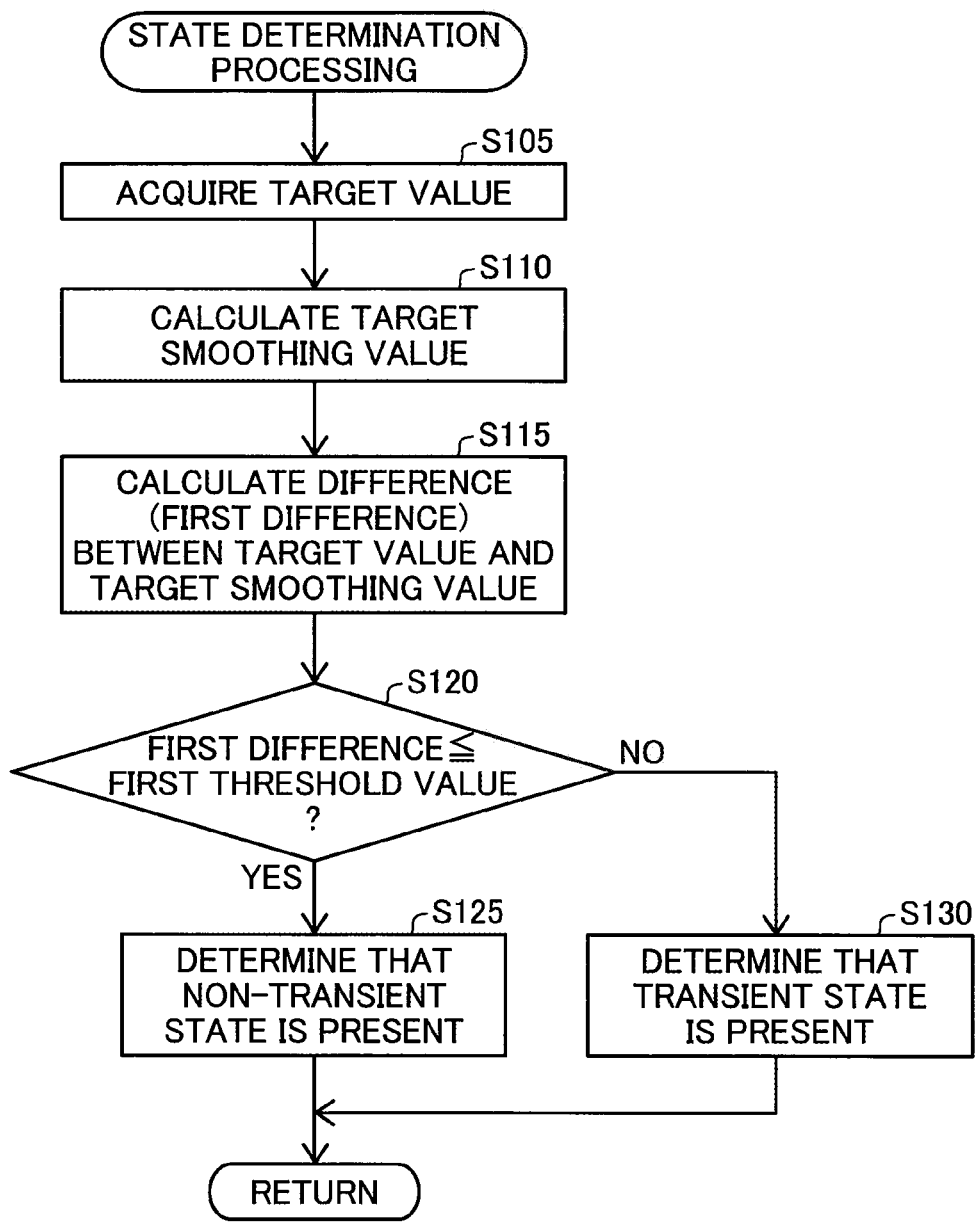
FIG. 2 is a flowchart showing the procedure of state determination processing.

A2. State Determination Processing:

FIG. 2 is a flowchart showing the procedure of the state determination processing. When an unillustrated starter switch in the vehicle is pressed so as to start up the fuel cell system 10, the state determination processing is performed by the control device 800.

The target value acquisition portion 810 acquires the target value from a main control portion (step S105). The target smoothing value calculation portion 830 uses the target value acquired in step S105 so as to calculate the target smoothing value (step S110). Specifically, the target smoothing value calculation portion 830 calculates the target smoothing value by use of formula (1) below.

$$Y(n+1)=Y(n)+[Tg-Y(n)]/K \quad (1)$$

In formula (1) described above, Y (n+1) represents a target smoothing value in the current (the n+1th) computation cycle, that is, a target to be calculated in step S110, Y (n) represents a target smoothing value in the preceding (the nth) computation cycle, Tg represents the target value and K represents a constant. The constant K is also referred to as a smoothing constant, and in the present embodiment, the constant K is a value which is obtained by dividing a time constant by a computation cycle. Formula (1) described above means that so-called first order lag processing is performed on a difference between the target value and the preceding target smoothing value, and that the preceding target smoothing value is added to the obtained value. The first order lag processing generally means processing in which, when it is assumed that the computation cycle is T and the time constant is t, a computation in formula (2) below is performed on an input signal (target value) X so as to determine a first order lag signal Xd.

$$Xd=X\{1-EXP(-T/t)\} \quad (2)$$

Here, $\{1-EXP(-T/t)\}$ may be regarded as being equal to T/t when T/t is sufficiently smaller than 1. Hence, the computation in formula (2) described above means a computation in which, when t/T is assumed to be K (smoothing constant), a difference ($[Tg-Y(n)]$) between the target value and the preceding target smoothing value is divided by the smoothing constant K.

Figure 3:
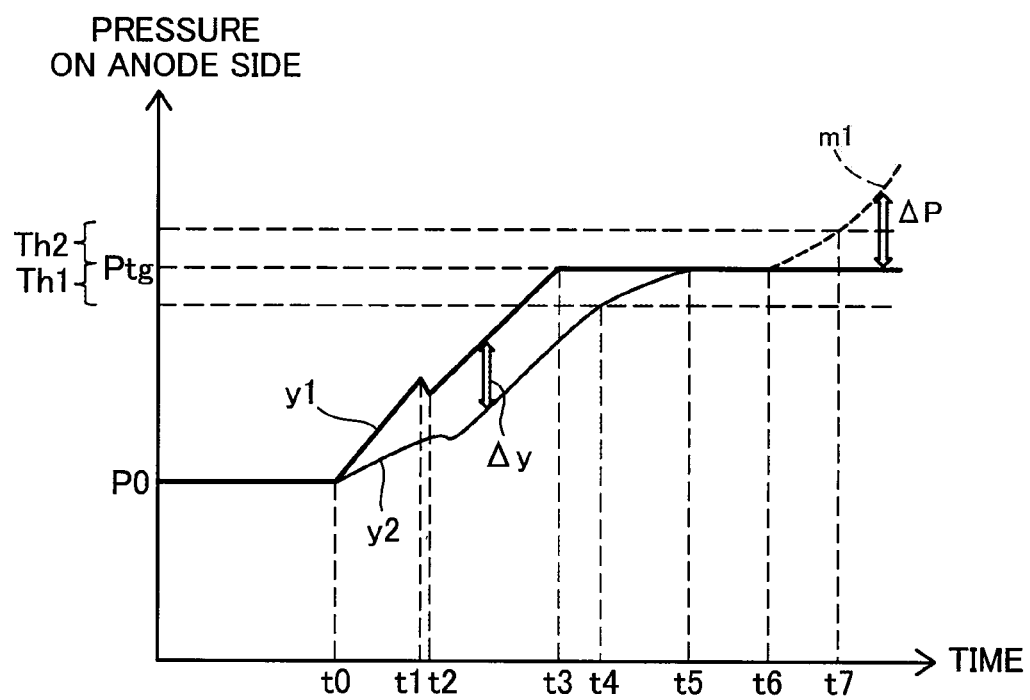
FIG. 3 is an illustrative diagram showing temporal changes in a target value and a target smoothing value.

FIG. 3 is an illustrative diagram showing temporal changes in the target value and the target smoothing value. In FIG. 3, the horizontal axis represents time, and the vertical axis represents the pressure on the anode side. In FIG. 3, a temporal change y1 represented by a thick solid line indicates a temporal change in the target value, and a temporal change y2 represented by a thin solid line indicates a temporal change in the target smoothing value. It is assumed that at, a time t0, the pressure on the anode side is a pressure P0 and that a non-transient state is present. In FIG. 3, a temporal change m1 in the actual measured value of the pressure on the anode side by the pressure sensor 340A when the state of the operation of the injector 330A is an abnormal state is represented by a broken line.

The target value is increased from the time t0, is reduced from a time t1 to a time t2, is increased again from the time t2 to a time t3, and is not changed after the time t3 when the pressure on the anode side reaches a final target pressure Ptg. The temporal change y1 in the target value as described above may occur, for example, in the following conditions. When the pressure on the anode side required from the requirement output is the pressure Ptg which is larger than the pressure P0, the main control device gradually increases the target value per computation cycle. However, when at the time t1, the requirement output is reduced, for example, because the driver reduces the amount of stepping on of the accelerator pedal, and the target value is reduced. However, when at the time t2, the amount of stepping on of the accelerator pedal is increased again, and the pressure on the anode side required by the requirement output is set to the pressure Ptg again, the main control device gradually increases the target value per computation cycle. Thereafter, when the pressure on the anode side reaches the pressure Ptg, the main control device keeps the target value at the pressure Ptg. In the conditions as described above, the temporal change y1 in the target value may occur.

As shown in FIG. 3, in the temporal change y2 in the target smoothing value in which the temporal change y1 in the target value is slowed down in terms of time, the target smoothing value is gradually increased from the time t0, is slightly reduced after the time t2, but is increased again immediately and reaches the pressure Ptg at a time t5. After the time t5, the pressure Ptg is kept. As described above, the target value is temporarily reduced between the time t1 and the time t2. However, in the target smoothing value, the reduction change is slowed down in terms of time so as to simply appear as a small change.

The target smoothing value, or the value of the temporal change y2 at each time is smaller than the target value, or the value of the temporal change y1. Hence, the time t5 when the target smoothing value reaches the pressure Ptg is later than the time t3 when the target value reaches the pressure Ptg. In conditions close to the pressure Ptg which is the final target value, a difference (hereinafter referred to as a "first difference") Δy between the target value and the target smoothing value is gradually decreased as time passes. Then, at the time t5, the first difference Δy is 0 "zero". In the present embodiment, the smoothing constant K in formula (1) is set such that the relationship between the target value and the target smoothing value is the relationship described above. A method of setting the smoothing constant K will be described later.

As shown in FIG. 2, the state identification portion 840 calculates the difference, or first difference between the target value and the target smoothing value (step S115). The state identification portion 840 determines whether the first difference calculated in step S115 is equal to or less than a first threshold value (step S120). A method of setting the first threshold value in step S120 will be described later. When it is determined that the first difference is equal to or less than the first threshold value (step S120: yes), the state identification portion 840 determines that the pressure on the anode side is in the non-transient state (step S125). By contrast, when it is determined that the first difference is not equal to or less than the first threshold value, that is, the first difference is larger than the first threshold value (step S120: no), the state identification portion 840 determines that the pressure on the anode side is in the transient state (step S130). After step S130 is performed, the process returns to step S105. The results of the determinations in steps S125 and S130 are stored in the unillustrated storage device included in the control device 800.

Figure 4:
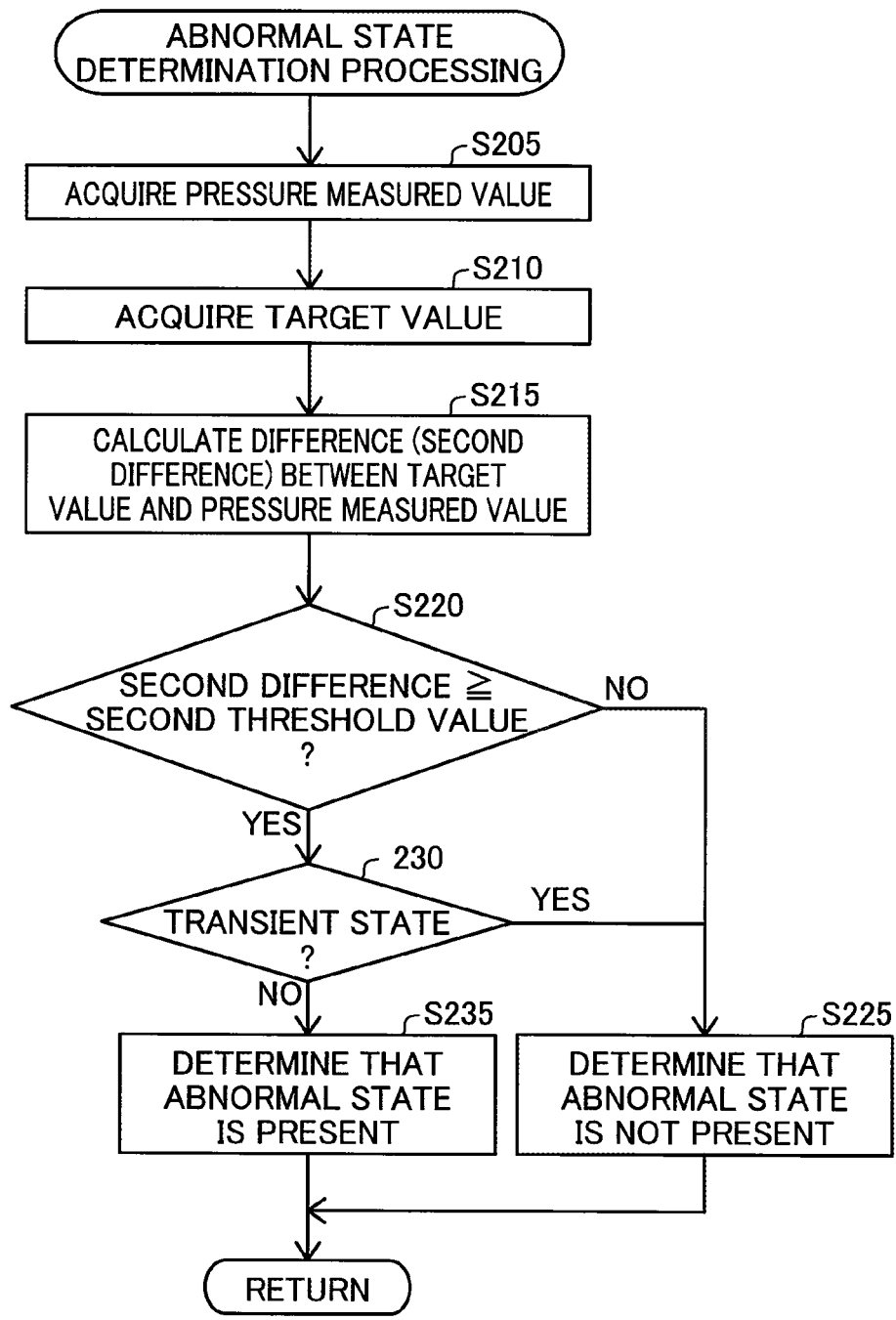
FIG. 4 is a flowchart showing the procedure of abnormal state determination processing.

A3. Abnormal State Determination Processing:

FIG. 4 is a flowchart showing the procedure of the abnormal state determination processing. When the unillustrated starter switch in the vehicle is pressed so as to start up the fuel cell system 10, the abnormal state determination processing is performed by the abnormality determination portion 850.

The abnormality determination portion 850 acquires the actual measured value (hereinafter simply referred to as a "pressure actual measured value") from the result of the detection by the pressure sensor 340A (step S205). The abnormality determination portion 850 acquires the target value from the main control device (step S210). The abnormality determination portion 850 calculates a difference (hereinafter referred to as a "second difference") between the target value acquired in step S210 and the pressure measured value acquired in step S205 (step S215).

The abnormality determination portion 850 determines whether the second difference is equal to or more than a second threshold value (step S220). When it is determined that the second difference is not equal to or more than the second threshold value, that is, the second difference is smaller than the second threshold value (step S220: no), the abnormality determination portion 850 determines that the pressure on the anode side is not in an abnormal state (step S225). In the present embodiment, the performance in step S225 means that it is determined that a normal state is present.

When it is determined that the second difference is equal to or more than the second threshold value (step S220: yes), the abnormality determination portion 850 determines whether the pressure on the anode side is in the transient state (step S230). Here, step S230 is perform based on the result of the state determination processing stored in the control device 800. When it is determined that the pressure on the anode side is in the transient state (step S230: yes), step S225 described above is performed. In other words, it is determined that the pressure on the anode side is not in an abnormal state. By contrast, when it is determined that pressure on the anode side is not in the transient state (step S230: no), the abnormality determination portion 850 determines that the state of the operation of the injector 330A is an abnormal state (step S235).

When the second threshold value is set larger than the first threshold value, as compared with a case where the second threshold value is set equal to or less than the first threshold value, it takes a long time to determine the abnormal state after the normal state is actually changed to an abnormal state. On the other hand, in a case where the second threshold value is set smaller than the first threshold value, when it is determined that the first difference Δy reaches the first threshold value and that the non-transient state is present, if the actual measured value of the pressure on the anode side has not reached the final target pressure Ptg, regardless of the pressure on the anode side being changed, or increased normally toward the final target pressure Ptg, a difference between the actual measured value and the final target pressure Ptg is equal to or more than the second threshold value, with the result that it may be erroneously determined that an abnormal state is present. Hence, in the present embodiment, the second threshold value is set equal to the first threshold value. However, the second threshold value may be set to a value different from the first threshold value.

For example, at a time t4 shown in FIG. 3, when the first difference Δy reaches the first threshold value Th1, it is determined that the pressure on the anode side is in the non-transient state. Hence, after the time t4, when the second difference is equal to or more than the second threshold value, it is determined that the state of the operation of the injector 330A is an abnormal state. For example, as shown in FIG. 3, because of a failure of the injector 330A, the second difference ΔP, which is a difference between the pressure Ptg and the pressure actual measured value ml, is gradually increased from a time t6, and then after a time t7 when the second difference ΔP reaches the second threshold value Th2, it is determined that the state of the operation of the injector 330A is an abnormal state.

Figure 5:
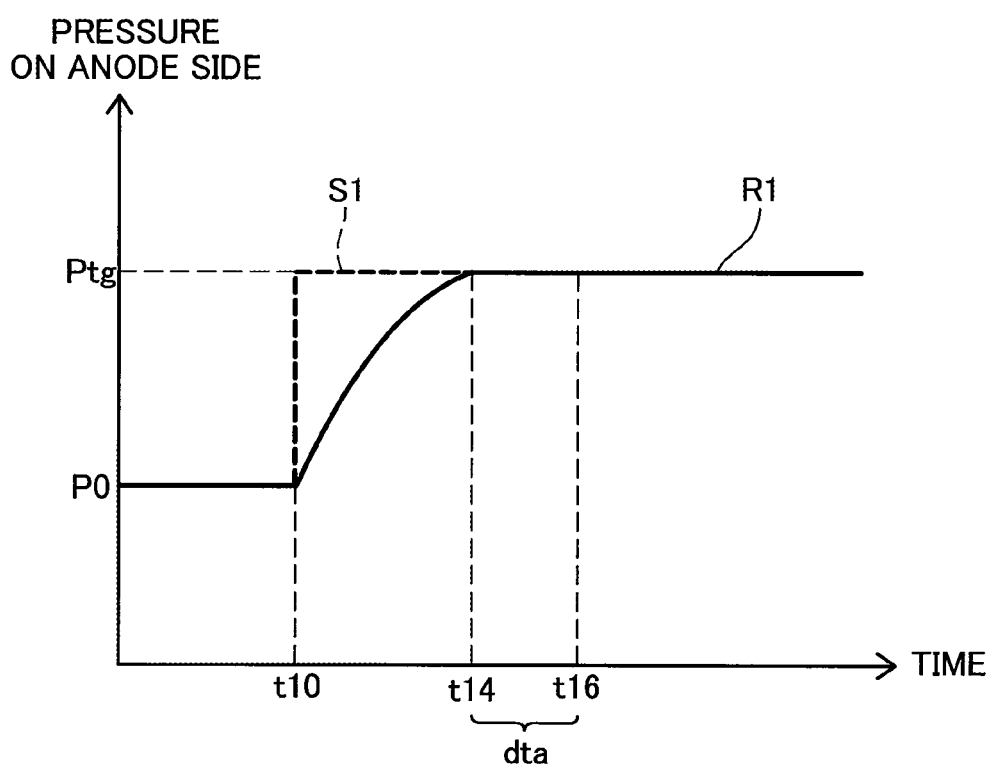
FIG. 5 is an illustrative diagram for illustrating a method of calculating a smoothing constant K.
Figure 6:
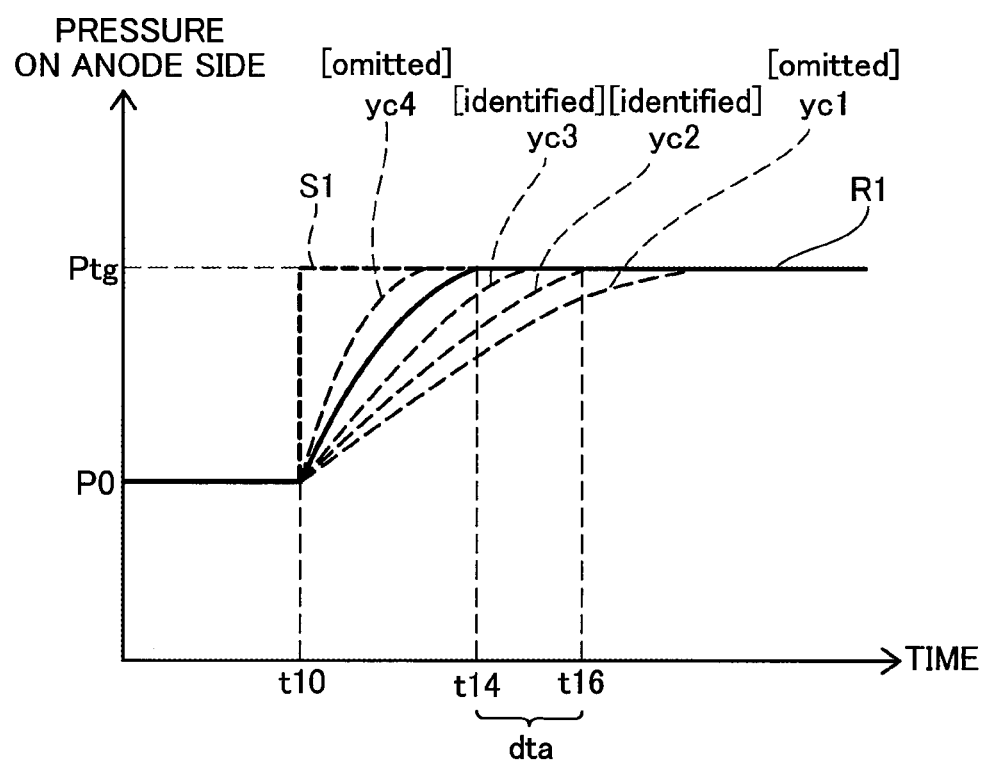
FIG. 6 is an illustrative diagram for illustrating the method of calculating the smoothing constant K.

A4. Smoothing Constant K and Method of Setting First Threshold Value:

FIGS. 5 and 6 are illustrative diagrams for illustrating a method of calculating the smoothing constant K described previously. Since the horizontal axis and the vertical axis of FIGS. 5 and 6 are the same as those of FIG. 3, the description thereof will be omitted. The smoothing constant K and the first threshold value are previously calculated on paper and are set in the control device 800. In the present embodiment, the smoothing constant K is set by a procedure below. However, the setting method is simply an example, and an appropriate value may be determined and set by performing an experiment using an actual device.

A temporal change (hereinafter referred to as the "upper limit temporal change") R1 in the pressure on the anode side when the injector 330A is operated at the upper limit of the response performance thereof is identified. The upper limit temporal change R1 is identified as, for example, an actual temporal change in the pressure on the anode side which is obtained when the target value instantaneously rises to the final target pressure. As a case where the target value instantaneously rises to the final target pressure, for example, a case where the target value is intentionally and instantaneously raised so that the injector 330A is operated at the upper limit of the response performance thereof is assumed. Examples of the case where the injector 330A is operated at the upper limit of the response performance thereof as described above include a case where purging is performed on the anode side by use of a pressure change for a short period of time, a case where a failure in power generation resulting from shortage of hydrogen is suspected, and a case where since the amount of stepping on of the accelerator pedal is the maximum, the maximum electric power output is realized for a short period of time.

In the example of FIG. 5, a temporal change (upper limit temporal change R1) in the actual pressure on the anode side when a target value S1 in which the pressure P0 rises to the final target pressure Ptg at a time t10 is set is drawn. The upper limit temporal change R1 as described above is previously determined by an experiment or the like. In the upper limit temporal change R1, a rise is started from the pressure P0 at the time t10, and the final target pressure Ptg is reached at a time t14. However, due to a variation in the product and the like, a variation in the time when the final target pressure Ptg is reached is produced, with the result that a time displacement date between the time t14 and a time t16 shown in FIG. 5 is expected.

Then, formula (1) described above is applied to the upper limit temporal change R1, and thus the target smoothing value is calculated. Here, in the smoothing constant K described above, a time constant t is changed, and thus a plurality of temporal changes in the target smoothing value, that is, the target smoothing value per computation cycle, is calculated. In the example of FIG. 6, four temporal changes yc1 to yc4 in the target smoothing value are drawn. Among the temporal changes yc1 to yc4 in the target smoothing value, the temporal change yc1 indicates a temporal change in a case where the time constant t is the largest, the temporal change yc2 indicates a temporal change in a case where the time constant t is the second largest, the temporal change yc3 indicates a temporal change in a case where the time constant t is the third largest, and the temporal change yc4 indicates a temporal change in a case where the time constant t is the smallest.

Then, among the temporal changes in the target smoothing value which are calculated, the temporal change in the target smoothing value is identified in which the time when the final target pressure Ptg is reached falls between the time t14 and the time t16. In the example of FIG. 6, the time when the final target pressure Ptg is reached in the temporal change yc1 is later than the time t16. The time when the final target pressure Ptg is reached in the temporal change yc4 is earlier than the time t14. By contrast, the times when the final target pressure Ptg is reached in the two temporal changes yc2 and yc3 fall between the time t14 and the time t16. Hence, the two temporal changes yc2 and yc3 in the target smoothing value are identified. In the temporal changes yc2 and yc3 in which the times when the final target pressure Ptg is reached fall between the time t14 and the time t16, the temporal change is lower than the upper limit temporal change R1 in each computation cycle.

Then, in the identified temporal changes yc2 and yc3 in the target smoothing value, the temporal change is identified in which the difference from the upper limit temporal change R1 is the largest, and the smoothing constant K which is determined from the time constant t used when the temporal change is calculated is used when the target smoothing value is calculated in step S110 described above. In the example of FIG. 6, in the two temporal changes yc2 and yc3 in the target smoothing value, the difference from the upper limit temporal change R1 is the largest in the temporal change yc2. Hence, the smoothing constant K which is calculated by use of the time constant t used when the temporal change yc2 in the target smoothing value is calculated is set to a smoothing constant K which is used when the target smoothing value is calculated.

As described above, the reason why among the four temporal changes in the target smoothing value, the temporal change yc1 in which the time when the final target pressure Ptg is reached is later than the time t16 is omitted will be described with reference to FIG. 7.

Figure 7:
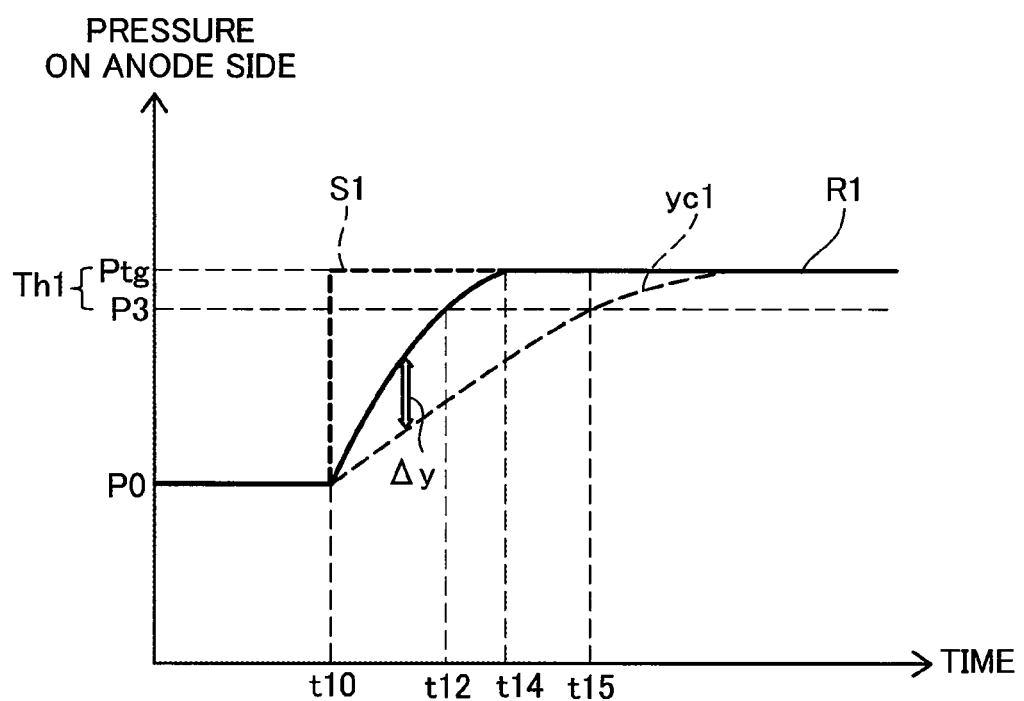
FIG. 7 is an illustrative diagram which extracts and shows the target value, an upper limit temporal change, and a temporal change shown in FIG. 6.

FIG. 7 is an illustrative diagram which extracts and shows the target value S1, the upper limit temporal change R1, and the temporal change yc1 shown in FIG. 6.

If in step S105, the target value S1 is acquired as the target value, the injector 330A is operated at the upper limit of the response performance, and the temporal change in the pressure on the anode side at that time is the upper limit temporal change R1. Here, when the target smoothing value obtained in step S110 is the temporal change yc1, the time when the first difference $\Delta y$ which is the difference between the target value and the target smoothing value reaches the first threshold value Th1 is a time t15. The time t15 is a time when a pressure P3 which is lower than the final target pressure Ptg by the first threshold value Th1 is reached. Here, since a change in the actual measured value of the pressure on the anode side is the upper limit temporal change R1, the time t12 when the pressure P3 is reached is earlier than the time t15 described above. Hence, it needs to be determined that the non-transient state is actually present at the time t12. However, in the temporal change yc1, it is necessary to wait until the time t15 which is significantly later than the time t12 so that it is determined that the non-transient state is present. Hence, even when the actual measured value of the pressure on the anode side is significantly displaced from the pressure Ptg because of, for example, a failure of the injector 330A immediately after the time t12, it is determined that the transient state is present, and thus the abnormal state determination processing in step S225 is performed, with the result that it may be erroneously determined that an abnormal state is not present. Hence, in the present embodiment, the temporal change yc1 is omitted in which, although the non-transient state is actually present, it is determined that the transient state is present for a long period of time.

The reason why among the four temporal changes in the target smoothing value, the temporal change yc4 in which the time when the final target pressure Ptg is reached is earlier than the time t14 is omitted will be described with reference to FIG. 8. As shown in FIG. 6, in the temporal change yc4, the value is larger than the upper limit temporal change R1 in each computation cycle.

Figure 8:
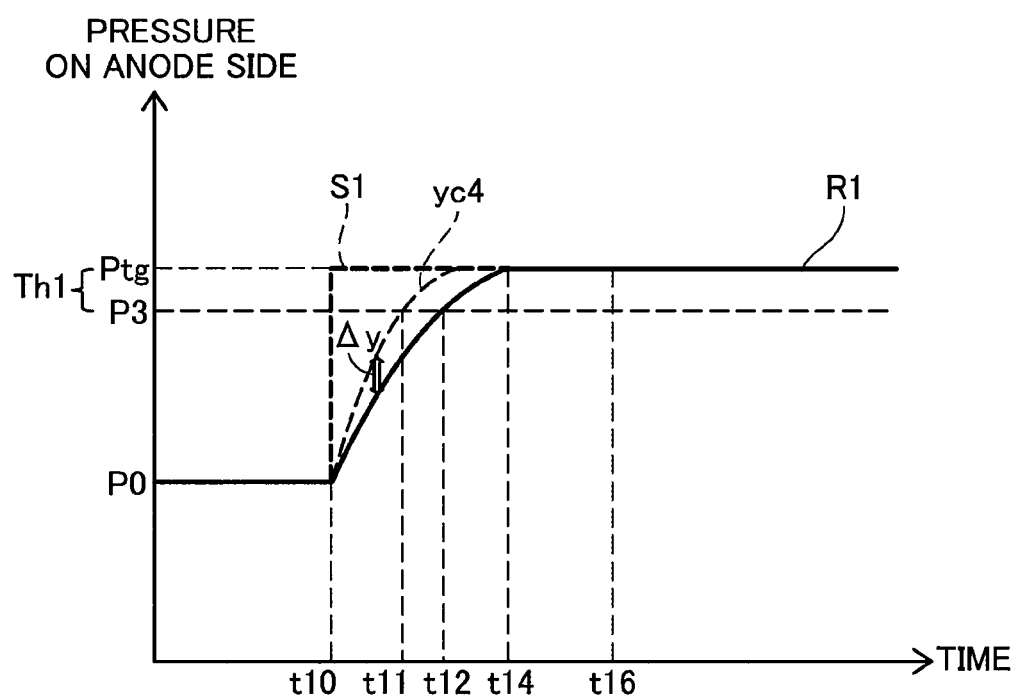
FIG. 8 is an illustrative diagram which extracts and shows the target value, the upper limit temporal change, and the temporal change shown in FIG. 6.

FIG. 8 is an illustrative diagram which extracts and shows the target value S1, the upper limit temporal change R1, and the temporal change yc4 shown in FIG. 6.

If in step S105, the target value S1 is acquired as the target value, the injector 330A is operated at the upper limit of the response performance, and the temporal change in the pressure on the anode side at that time is the upper limit temporal change R1. Here, when the target smoothing value obtained in step S110 is the temporal change yc4, the time when the first difference $\Delta y$ which is the difference between the target value and the target smoothing value reaches the first threshold value Th1 is a time t11. The time t11 is a time when the pressure P3 which is lower than the final target pressure Ptg by the first threshold value Th1 is reached. Here, since a change in the actual measured value of the pressure on the anode side is the upper limit temporal change R1, the time t12 when the pressure P3 is reached is later than the time t11 described above. It needs to be determined that the transient state is actually present at the time t11. However, in the temporal change yc4, when the time t11 is reached, it is erroneously determined that the non-transient state is present. However, since, at the time t11, the transient state is actually present, the difference between the final target pressure Ptg and the actual measured value of the pressure on the anode side is still large. Hence, between the time t11 and the time t12, it is likely that step S235 in the abnormal state determination processing is performed and thus that it is erroneously determined that an abnormal state is present. Hence, in the present embodiment, the temporal change yc4 is omitted so that it is prevented from being determined that the non-transient state is present though the transient state is actually present.

The method of setting the first threshold value will then be described. As the first threshold value is set lower, the timing at which it is determined that the non-transient state is present is later. Consequently, although in actuality the transient state has already been changed to the non-transient state, it may be determined that the transient state is present. In this case, although an abnormal state is actually present, it may be erroneously determined that the normal state is present. On the other hand, as the first threshold value is set larger, the second threshold value which is the same value as the first threshold value is increased. Hence, it is impossible to determine that an abnormal state is present until an abnormal state occurs such that the measured value is significantly displaced from the final target pressure Ptg. Thus, in view of a delay in timing at which it is determined that the transient state is changed to the non-transient state and a delay in timing at which it is determined that the state of the operation of the injector 330A is an abnormal state, it is possible to set an appropriate value.

In the control device 800 of the embodiment described above, the target value is used to calculate the target smoothing value, and when the first difference Δy which is the difference between the target smoothing value and the target value is equal to or more than the first threshold value Th1, it is determined that the transient state is present, whereas when the first difference Δy is smaller than the first threshold value Th1, it is determined that the non-transient state is present, with the result that as compared with a configuration in which, as in the conventional technology, the target value and the amount of control are compared, it is possible to suppress an erroneous determination as to whether the transient state is present. In other words, since the target smoothing value is a value in which the temporal change in the target value is slowed down, it is unlikely that a rapid change which occurs when a change in the target value is rapidly changed for a short period of time and is returned again appears as a large change, and thus it is possible to suppress an erroneous determination that the non-transient state is present though the transient state is present. Moreover, the target smoothing value is a value in which the first difference that is the difference between the target smoothing value and the target value is equal to or more than the difference between the amount of control when the control target device is operated at the upper limit of the response performance and the target value, and thus it is possible to suppress an erroneous determination that the non-transient state is present though the amount of control is actually in the transient state.

When the second difference is smaller than the second threshold value, it is determined that the state of the operation is not an abnormal state, when the second difference is equal to or more than the second threshold value and the amount of control is determined to be in the transient state, it is determined that the state of the operation is not an abnormal state, and when the second difference is equal to or more than the second threshold value and the amount of control is determined to be in the non-transient state, it is determined that the state of the operation is an abnormal state, with the result that it is possible to accurately determine whether an abnormal state is present.

The time constant t is adjusted, and thus it is possible to adjust the degree (slowness) of the temporal change in the target smoothing value. Hence, even when due to a product variation and the like a variation in the upper limit of the response performance of the control target device is produced, the time constant t is adjusted, and thus it is possible to calculate an appropriate target smoothing value.

B. Other Embodiments

B1. Another Embodiment 1

Although in the embodiment described above, when the target smoothing value is determined, the so-called first order lag processing is performed on the difference between the target value and the preceding target smoothing value, the present disclosure is not limited to this configuration. For example, second order lag processing may further be performed in which after the first order lag processing is performed, the first order lag processing is performed one more time. In other words, the value obtained by performing the so-called first order lag processing on the difference between the target value and the preceding target smoothing value may be assumed to be a new preceding target smoothing value, and the first order lag processing may further be performed on the difference between the target value and the new preceding target smoothing value. For example, on the difference between the target value and the preceding target smoothing value, so-called processing for calculating a moving average may be performed. As the moving average, an arbitrary method such as a simple moving average, a weighted moving average, or an exponential moving average may be adopted. For example, on the difference between the target value and the preceding target smoothing value, rate processing may be performed. The rate processing means processing in which the limit value of at least one of the upper limit value and the lower limit value is previously set on a difference value, and in which when the difference value exceeds the limit value, the difference value is replaced by the limit value. Even when the second order lag processing, the processing for calculating the moving average, or the rate processing described above is performed, as in the case where the first order lag processing is performed, the target value is replaced by the result of the processing, and thus it is possible to slow down the temporal change in the target value.

B2. Another Embodiment 2

In the abnormal state determination processing of the embodiment described above, when the actual measured value of the pressure on the cathode side is equal to or more than the second threshold value and it is determined that the transient state is not present, it is determined that the state of the operation of the injector 330A is an abnormal state, however, the present disclosure is not limited to this configuration. In this case, it may be determined that the hydrogen supply/discharge system 300A is in an abnormal state. In the configuration described above, it may be determined that an abnormality occurs in any one or more of the injector 330A, the tanks 390A and 390B, the main shut valves 395A and 395B, the pressure reducing valve 320A, the pressure sensor 340A, the gas-liquid separator 370A, the circulation pump 380A, the hydrogen supply path 310A, the anode off-gas discharge path 360A, the circulation flow path 385A, and the communication path 312.

B3 Another Embodiment 3

Although in the embodiment described above, the target (hereinafter referred to as a "state determination target") which is identified in the state determination processing so as to be in the transient state or the non-transient state is the pressure on the anode side, the present disclosure is not limited to this configuration. For example, the state determination target may be the pressure on the cathode side. In the configuration described above, when the difference between the actual measured value of the pressure sensor provided in the air supply path 410A or the air discharge path 420A and the target value is equal to or more than the second threshold value, and the transient state is not present, it may be determined that an abnormal state is present in the air supply/discharge system 400A, that is, an abnormality occurs in any one or more of the air compressor 440A, the flow division valve 450A, the pressure adjustment valve 460A, the air supply path 410A and the air discharge path 420A. For example, the state determination target may be the flow rate of air supplied to the cathode side. In the configuration described above, when a mass flow meter is arranged on the downstream side of the air compressor 440A in the air supply path 410A, the actual measured value of the mass flow meter is equal to or more than the second threshold value and the transient state is not present, it may be determined that the state of the operation of the air compressor 440A is an abnormal state. For example, the state determination target may be the temperature of the fuel cell 100A. In the configuration described above, a temperature sensor is provided in the vicinity of the fuel cell 100A in the coolant supply path 520A, and the temperature measured with the temperature sensor is measured as the temperature of the fuel cell 100A. When the actual measured value of the temperature sensor is equal to or more than the second threshold value, and the transient state is not present, it may be determined that an abnormal state is present in the cooling system 500A, that is, an abnormality occurs in any one or more of the coolant pump 550A, the radiator 510A, the three-way valve 560A, the coolant supply path 520A, the coolant discharge path 530A, and the bypass path 540A. For example, the state determination target may be the output current value of the fuel cell 100A. In the configuration described above, when a current sensor is provided in the power supply circuit 600A, the actual measured value of the current sensor is equal to or more than the second threshold value and the transient state is not present, it may be determined that at least one of the fuel cell 100A and the power supply circuit 600A is in an abnormal state. As described above, an arbitrary amount of control which may be changed according to the operation of various control target devices (such as the injector 330A, the air compressor 440A, the coolant pump 550A, and the power supply circuit 600A) in the fuel cell system 10 may be the state determination target.

Although the control target device is an element which is included in the fuel cell system 10, the present disclosure is not limited to this configuration. For example, in a vehicle which includes an internal-combustion engine, a coolant circulation pump for cooling the internal-combustion engine may be the control target device. In the configuration described above, the temperature of the internal combustion engine, that is, the temperature of the coolant, may be the state determination target, and when the temperature of the coolant is equal to or more than the second threshold value, and the transient state is not present, it may be determined that the state of the operation of the coolant circulation pump is abnormal. The control target device is not limited to a device which is installed in a vehicle, and the control target device may be a device which is installed in an arbitrary moving body other than a vehicle or a device which is fixedly installed in land or a building. For example, the control target device may be a constituent element of a fuel cell system which is fixedly installed as a power supply source in a house, a factory, or the like so as to be used.

B4. Another Embodiment 4

Although in the embodiment described above, the target value is increased from the pressure P0 to the final target pressure Ptg, the target value may be reduced. In the configuration described above, the target smoothing value at each time is larger than the target value. However, even in the configuration described above, the difference between the target value and the target smoothing value is equal to or more than the difference between the target value and the upper limit temporal change. In other words, the target smoothing value calculation portion 830 may, in general, calculate the target smoothing value in which the temporal change in the target value is slowed down and in which the difference between the target smoothing value and the target value is equal to or more than the difference between the value of the amount of control when the control target device is operated at the upper limit of the response performance and the target value. As in the temporal change yc4 shown in FIGS. 6 and 8, the target smoothing value may be calculated such that the difference between the target smoothing value and the target value is smaller than the difference between the value of the amount of control when the control target device is operated at the upper limit of the response performance and the target value. In the configuration described above, when the temporal change y1 between the times t1 and t2 shown in FIG. 3 occurs, it is possible to slow down the temporal change, with the result that it is possible to suppress an erroneous determination that the non-transient state is present though the transient state is present.

B5. Another Embodiment 5

When as a result of the abnormal state determination processing described above it is determined that an abnormal state is present, processing as described below may be performed. For example, the jetted amount of the injector 330A may be increased or decreased. The flow rate of the gas by the circulation pump 380A may be increased or decreased. The requirement output may be reduced such that the amount of power generated in the fuel cell 100A is reduced. By reducing the opening of the purge valve 375A, the discharge of the anode off-gas may be reduced. In the processing described above, the control portion 820 transmits, to the control target device, a special signal which is different from a signal that is transmitted in the normal state. The special signal is, for example, a signal which includes a jetting period and a jetting duty value different from a jetting period and a jetting duty value for hydrogen that are determined by the feedback control in the normal state according to the difference between the pressure on the anode side and the target value.

B6. Another Embodiment 6

Although in the embodiment described above, the result of the state determination processing, that is, the result of the determination that the transient state is present or that the non-transient state is present, is used in the abnormal state determination processing, the present disclosure is not limited to this configuration. Instead of or in addition to the abnormal state determination processing, the result may be used in another arbitrary type of processing. For example, the result of the state determination processing may be used in processing in which the result is transmitted to the driver by an image or sound.

B7. Another Embodiment 7

In the embodiment described above, part of a configuration realized by hardware may be replaced by software whereas part of a configuration realized by software may be replaced by hardware. For example, at least one functional portion of the target value acquisition portion 810, the control portion 820, the target smoothing value calculation portion 830, the state identification portion 840, and the abnormality determination portion 850 may be realized by an integrated circuit, a discrete circuit or a module obtained by combining these circuits. When part or the whole of a function in the present disclosure is realized by software, the software (or computer program) may be provided in a form in which the software is stored in a computer-readable recording medium. The "computer-readable recording medium" is not limited to a portable recording medium such as a flexible disc or a CD-ROM and includes an internal storage device within a computer such as various types of RAMS and ROMs and an external storage device which is fixed in a computer such a hard disk. In other words, the "computer-readable recording medium" has a wide meaning that includes an arbitrary recording medium in which data packets are able to be fixed instead of temporarily storing them.

The present disclosure is not limited to the embodiments described above, and may be realized with various configurations without departing from the spirit thereof. For example, the technical features in the embodiments may be replaced or combined as necessary in order to solve part or the whole of the problem described above or in order to achieve part or the whole of the effects described above. When the technical features are not described as being necessary in the present specification, they may be omitted as necessary. For example, the present disclosure may be realized by forms which will be described below.

[1] According to one aspect of the present disclosure, a control device for controlling a control target device is provided. The control device includes: a target value acquisition portion configured to acquire a target value of amount of control per predetermined computation cycle, the amount of control being changed according to an operation of the control target device; a control portion configured to control the control target using the acquired target value; a target smoothing value calculation portion configured to calculate a target smoothing value in which a temporal change in the target value is slowed down; and a state determination portion configured to calculate a first difference that is a difference between the target value and the target smoothing value to determine that the amount of control is in a transient state when the calculated first difference is equal to or more than a predetermined first threshold value and to determine that the amount of control is in a non-transient state when the first difference is smaller than the first threshold value.

In the control device of this form, the target value is used to calculate the target smoothing value, and when the first difference which is the difference between the target smoothing value and the target value is equal to or more than the first threshold value, it is determined that the transient state is present, whereas when the first difference is smaller than the first threshold value, it is determined that the non-transient state is present, with the result that as compared with a configuration in which, as in the conventional technology, the target value and the amount of control are compared, it is possible to suppress an erroneous determination as to whether the transient state is present. In other words, since the target smoothing value is a value in which the temporal change in the target value is slowed down, it is unlikely that a rapid change which occurs when the degree of change in the target value is rapidly changed for a short period of time and is returned again appears as a large change, and thus it is possible to suppress an erroneous determination that the non-transient state is present though the transient state is present.

[2] The control device of the aspect described above may further include: a measured value acquisition portion configured to acquire a measured value of the amount of control; and an abnormality determination portion configured to determine a state of an operation of the control target device. The abnormality determination portion may calculate a second difference that is a difference between the target value and the acquired measured value. The abnormality determination portion determines that the state of the operation is not an abnormal state when the calculated second difference is smaller than a second threshold value. The abnormality determination portion may determine that the state of the operation is not the abnormal state when the calculated second difference is equal to or more than the second threshold value and the amount of control is determined to be in the transient state. The abnormality determination portion may determine that the state of the operation is the abnormal state when the calculated second difference is equal to or more than the second threshold value and the amount of control is determined to be in the non-transient state. In the fuel cell system of this aspect, when the second difference is smaller than the second threshold value, it is determined that the state of the operation is not an abnormal state, when the second difference is equal to or more than the second threshold value and the amount of control is determined to be in the transient state, it is determined that the state of the operation is not an abnormal state, and when the second difference is equal to or more than the second threshold value and the amount of control is determined to be in the non-transient state, it is determined that the state of the operation is an abnormal state, with the result that it is possible to accurately determine whether an abnormal state is present.

[3] In the control device of the aspect described above, the target smoothing value may be a value in which the first difference that is the difference between the target smoothing value and the target value is equal to or more than a difference between the amount of control when the control target device is operated at an upper limit of response performance and the target value. In the control device of this aspect, the target smoothing value is a value in which the first difference that is the difference between the target smoothing value and the target value is equal to or more than the difference between the amount of control when the control target device is operated at the upper limit of the response performance and the target value, and thus it is possible to suppress an erroneous determination that the non-transient state is present though the amount of control is actually in the transient state.

[4] In the control device of the aspect described above, the target smoothing value calculation portion may calculate the target smoothing value per computation cycle by use of a computation formula indicated in formula (1) below:

$$Y(n+1)=Y(n)+[Tg-Y(n)]/K \qquad (1)$$

where Y (n+1) represents the target smoothing value in a current computation cycle, Y (n) represents the target smoothing value in a preceding computation cycle, Tg represents the target value in the current computation cycle, and K represents a constant. In the control device of this aspect, it is possible to easily calculate the target smoothing value.

The present disclosure may be realized in various aspects. For example, the present disclosure may be realized in aspects such as a system which includes a control device and a control target device, a fuel cell system serving as the system, a vehicle which installs a fuel cell system, a control method, a computer program for realizing the control method, and a storage medium which stores the computer program.

What is claimed is:

1. A fuel cell system comprising:
   a fuel cell; and
   a control device for controlling the fuel cell, the control device including:
      a memory storing instructions; and
      a processor configured to execute the instructions to:
         acquire a target value of amount of control per predetermined computation cycle, the amount of control being determined according to an operation of the fuel cell;
         control the fuel cell using the acquired target value;
         calculate a target smoothing value in which a temporal change in the target value is slowed down;
         calculate a first difference that is a difference between the target value and the target smoothing value at a same computation cycle to determine that the amount of control is in a transient state when the calculated first difference is equal to or more than a predetermined first threshold value and to determine that the amount of control is in a non-transient state when the first difference is smaller than the first threshold value; and
         control the fuel cell based on the determined amount of control being in the transient state or in the non-transient state.

2. The fuel cell system according to claim 1, wherein the processor is further configured to execute the instructions:
   acquire a measured value of the amount of control; and
   determine a state of an operation of the fuel cell, wherein determining the state of the operation of the fuel cell comprises:
      calculating a second difference that is a difference between the target value and the acquired measured value,
      determining that the state of the operation is not an abnormal state when the calculated second difference is smaller than a second threshold value,
      determining that the state of the operation is not the abnormal state when the calculated second difference is equal to or more than the second threshold value and the amount of control is determined to be in the transient state, and
      determining that the state of the operation is the abnormal state when the calculated second difference is equal to or more than the second threshold value and the amount of control is determined to be in the non-transient state.

3. The fuel cell system according to claim 1, wherein the target smoothing value is a value in which the first difference that is the difference between the target smoothing value and the target value is equal to or more than a difference between the amount of control when the fuel cell is operated at an upper limit of response performance and the target value.

4. The fuel cell system according to claim 1, wherein calculating the target smoothing value comprises calculating the target smoothing value per the computation cycle by use of a computation formula indicated in formula (1) below:

$$Y(n+1)=Y(n)+[Tg-Y(n)]/K \qquad (1)$$

where Y (n+1) represents the target smoothing value in a current computation cycle, Y (n) represents the target smoothing value in a preceding computation cycle, Tg represents the target value in the current computation cycle, and K represents a constant.

5. The fuel cell system according to claim 1, wherein the target value and the target smoothing value are changed over time, and the processor is further configured to execute the instructions to:
   calculate the first difference by subtracting the target smoothing value at a point in time in the computation cycle from the target value at the same point in time.

6. The fuel cell system according to claim 2, wherein the second threshold value is set equal to the first threshold value.

7. A control method of controlling a fuel cell, the control method comprising:
   acquiring a target value of amount of control per predetermined computation cycle, the amount of control being changed according to an operation of the fuel cell;
   controlling the fuel cell using the acquired target value;
   calculating a target smoothing value in which a temporal change in the target value is slowed down;
   calculating a first difference that is a difference between the target value and the target smoothing value at a same computation cycle;
   determining that the amount of control is in a transient state when the calculated first difference is equal to or more than a predetermined first threshold value and determining that the amount of control is in a non-transient state when the first difference is smaller than the first threshold value; and
   controlling the fuel cell based on the determined amount of control being in the transient state or in the non-transient state.

8. The control method according to claim 5, wherein the target value and the target smoothing value are changed over time, and the control method further comprises:

calculating the first difference by subtracting the target smoothing value at a point in time in the computation cycle from the target value at the same point in time.

9. A non-transitory computer readable storage medium having computer readable instructions stored therein, which when executed by a computer, cause the computer to:
acquire a target value of amount of control per predetermined computation cycle, the amount of control being changed according to an operation of a fuel cell;
control the fuel cell using the acquired target value;
calculate a target smoothing value in which a temporal change in the target value is slowed down;
calculate a first difference that is a difference between the target value and the target smoothing value at a same computation cycle;
determine that the amount of control is in a transient state when the calculated first difference is equal to or more than a predetermined first threshold value and determining that the amount of control is in a non-transient state when the first difference is smaller than the first threshold value; and
control the fuel cell based on the determined amount of control being in the transient state or in the non-transient state.

10. The non-transitory computer readable storage medium according to claim 9, wherein the target value and the target smoothing value are changed over time, and the non-transitory computer readable storage medium further includes computer readable instructions stored therein, which when executed by the computer, cause the computer to:
calculate the first difference by subtracting the target smoothing value at a point in time in the computation cycle from the target value at the same point in time.

* * * * *